SIGNAL TRACKING NOISE CANCELLATION FOR TELEVISION RECEIVER

Filed Oct. 24, 1965

Inventor
ROBERT B. HANSEN
BY
Mueller, Aichele & Rauner
ATTYS.

Inventor
ROBERT B. HANSEN
BY
Mueller, Aichele & Rauner
ATTYS

United States Patent Office 3,437,751

Patented Apr. 8, 1969

3,437,751

SIGNAL TRACKING NOISE CANCELLATION FOR TELEVISION RECEIVER

Robert B. Hansen, Arlington Heights, Ill., assignor to Motorola, Inc., Franklin Park, Ill., a corporation of Illinois Filed Oct. 24, 1965, Ser. No. 504,840
Int. Cl. H04n 3/16, 5/44
U.S. Cl. 178—7.5 3 Claims

ABSTRACT OF THE DISCLOSURE

A noise pulse separating device is coupled to a television signal source so that only the alternating current portion is applied thereto. A fixed bias applied to the separating device causes amplitude separation of the noise from the television signal to be used for cancellation purposes. A control signal from the synchronizing signal separator is variable with the alternating current component of the signal and is applied to the separating device to change the fixed bias for differing signal levels.

Television reception is effected by the transmission of composite video signals having video frequency components and synchronizing pulse components. Circuitry is provided in the television receiver to separate the synchronizing signal components from the received signal video components with the separated sync pulses being subsequently utilized in line and field deflection systems to synchronize the scanning of the beam of a cathode ray tube with that of a transmitter camera. Noise disturbances accompanying the transmitted television signal can seriously impair the proper function of the synchronization and automatic gain control circuits. Since the noise pulses are of the same polarity as the synchronizing pulses, and are often of much greater amplitude, false or even complete loss of synchronization may result. Furthermore, such impulse noise can cause the AGC to respond falsely as though the noise were a part of the received signal and making the signal appear stronger than it actually is.

Noise pulses having the greatest effect on the AGC circuit and the synchronizing signal separator circuit are those which are greater in amplitude than the synchronizing pulses. The usual method employed to provide immunity to such high energy noise is to use a canceling circuit whereby a portion of the noise above the level of the sync pulses is amplified and inverted in a separate channel and used to cancel noise in the composite video signal. This method requires a precise bias to be maintained so that only noise pulses extending beyond the sync pulses are so amplified and inverted. Thus, noise cancellation must be carried out in such a manner that the noise pulses are separated at or very near the tips of the sync signals; separation at or below a level will result in cancellation of the synchronizing signal itself whereas separation at too high a level results in incomplete separation and less than fully effective cancellation.

Since the amplitude of the received television signal at the receiver will vary with the distance from the transmitting antenna to the receiver, and with the level of the transmitted signal, it is desirable that the noise separator circuit be automatically varied to track with the peak amplitude of the sync pulses. Further, the total energy in the composite video signal will vary with changes in the picture content and thus it is also desirable that the operating level of the noise canceling circuit be dependent on the picture content.

Prior art systems have provided automatic control for noise canceling circuits by coupling a control voltage thereto which is dependent on the amplitude of the received television signal, the source of this control voltage usually being the AGC circuit. This method fails to take into account the effect that variations in picture content has on the noise canceling circuit and does not provide automatic adjustment of the noise circuit below the AGC threshold.

An object of this invention is to provide an improved noise canceling circuit for a television receiver which operates in a stable reliable manner and requires but simple and inexpensive circuit components.

Another object is to provide a noise gating circuit which separates and amplifies a wide range of noise pulses greater in amplitude than the sync pulses independently of the amplitude of the sync pulses.

Another object is to provide such a noise canceling circuit wherein control thereof automatically varies in accordance with changes in the amplitude of the received television signal and also in accordance with changes in its associated picture content.

A feature of the present invention is the provision of a control network direct current coupled to a noise canceling circuit for applying thereto a bias proportional to the amplitude of the received television signal and to its associated picture content.

Another feature is the provision of circuitry to maintain the bias on a noise canceling circuit independently of the average DC component arising from changes in the amplitude of the received television signal.

Figure 1:
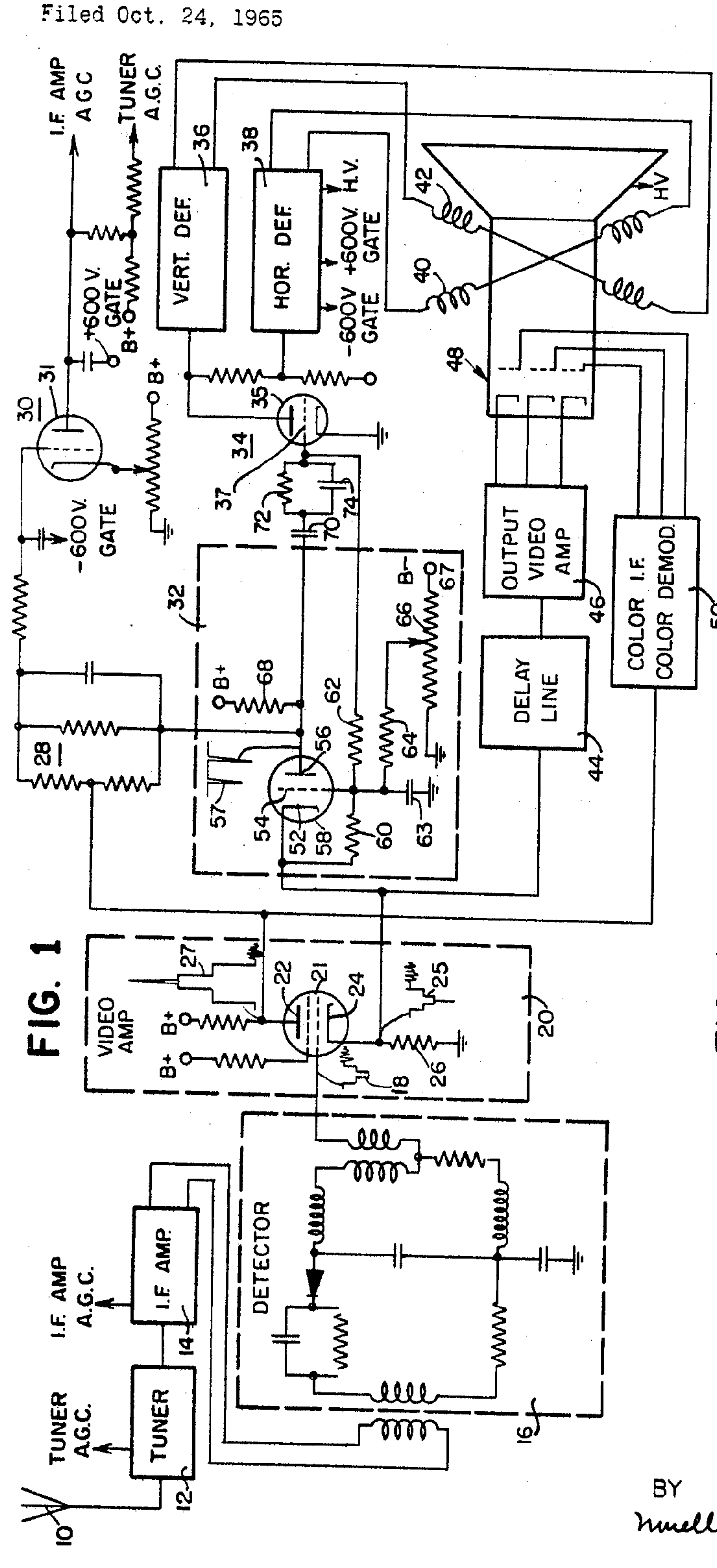
FIG. 1 is a diagram partially schematic and partially in block of a television receiver incorporating the invention.

In a specific embodiment of the invention, demodulated television signals from the cathode of a video amplifier tube are applied to a cathode of a noise canceling tube which amplifies only noise pulses extending beyond sync pulse peaks. The amplified noise pulses are combined with an opposite polarity demodulated television signal appearing on the plate of the video amplifier tube to thereby provide a signal substantially free of unwanted noise disturbances for application to the synchronizing separator circuit and to the AGC circuit of the receiver. Since the peak amplitudes of the sync pulses relative to their average DC level may change due to two factors, namely the amplitude of the received television signal and picture content of the demodulated video signal, the noise canceling circuit is provided with a bias that varies in accordance with said factors. This variable bias is derived from the synchronizing separator circuit and is DC coupled to the grid of the noise canceling circuit. Thus, complete cancellation of noise pulses greater in amplitude than the sync pulses will result regardless of changes in the amplitude of the sync pulses. The detector output contains an average DC component which varies with the amplitude of the received television signal. The adverse effect that this DC component has on the operation of the noise canceling circuit is overcome by employing a resistor or a capacitor, depending on the embodiment, connected between the detector and the noise canceling circuit in a manner such that the bias on the noise canceling circuit is independent of this DC component.

Referring now to the drawing, the color television receiver therein shown includes tuner 12 to receive and frequency convert incoming color television signals appearing at antenna 10. The output intermediate frequency signal developed by tuner 12 is coupled through IF amplifier 14 to detector 16 for demodulating the composite video signal having luminance components, chrominance components and synchronizing components. The composite video signal is amplified in video amplifier 20, the cathode of amplifier tube 21 coupling the luminance components through a delay line 44 and a video output amplifier 46 to the multiple cathodes of cathode ray tube 48. The anode of video amplifier tube 21 couples the chrominance components through the color IF and color demodulator combination 50 which separates the color information from the composite video signal to provide color difference signals which are applied to the multiple grids of cathode ray tube 48.

The demodulated television signal appearing at the plate of tube 21 is also DC coupled through matrixing and isolation network 28 to automatic gain control (AGC) circuit 30 wherein a direct current control voltage indicative of the strength of the received television signal is developed. The AGC circuit is gated by means of a positive pulse occurring at the horizontal deflection freffuency capacitor coupled to the anode of electron tube 31. A negative pulse at the horizontal deflection frequency is applied to the grid of tube 31 to neutralize the effect of a charge build-up which may occur by reason of the interelectrode capacitance in tube 31 resulting from the applied positive pulse at its anode. This control voltage is applied from the anode of tube 31 to the respective amplifying devices in tuner 12 and IF amplifier 14 for the regulation of the gain thereof in accordance with principles well known to those skilled in the art.

The demodulated television signal is also coupled through matrixing and isolation network 28 to synchronizing signal separator circuit 34. Electron tube 35 develops a negative self-bias through known grid-leak detector action, so that only synchronizing pulse components appear at the output. The vertical synchronizing components are applied to the vertical deflection system 36, which develops and applies a sawtooth wave current signal to the magnetic deflection yoke 42 on the cathode ray tube 48 for vertical scanning. The horizontal components are applied to the horizontal deflection system 38, which develops a suitable sawtooth scanning current in the magnetic deflection yoke 40 for horizontal deflection, as well as providing high voltage to the screen of cathode ray tube 48 and both negative and positive pulses for AGC circuit 30.

The foregoing description is applicable to the operation of a television receiver in general terms. Since such operation is generally well known to those skilled in the art, further detailed discussion is believed to be unnecessary. The following discussion and description concerns the provision of the present invention in minimizing the deleterious effects of impulse noise disturbances upon the automatic gain control circuit and the synchronizing signal separating circuit. Since the noise pulses having the greatest effect on these circuits are those which are greater in amplitude than the synchronizing pulses, a noise canceling circuit 32 is provided to eliminate these high energy disturbances.

The demodulated signal represented by waveform 18 is DC coupled to the control grid of video amplifier tube 21 and appears on cathode 24 by conventional cathode follower operation in conjunction with cathode resistor 26. The waveform 25 appearing thereat is coupled to cathode 52 of electron tube 58, which is biased so that only noise pulses greater in amplitude than the synchranizing pulses will be amplified therethrough. Tube 58 could, of course, be some other type of electron valve such as a transistor. Therefore, the only signal appearing on anode 56 of tube 58 due to waveform 25 will be negative polarity noise pulses 57. Waveform 18 is amplified by video amplifier 20 so that a positive polarity waveform 27 will appear on anode 22. Waveforms 27 and 57 will combine in matrixing and isolation network 28 to provide a signal substantially free of noise pulses greater in amplitude than the synchronizing pulses to be utilized by both synchronizing separator circuit 34 and AGC circuit 30.

In order to provide background brightness, it is necessary that detector 16 be direct current coupled through the serial combination of video amplifier 20, delay line 44 and second video amplifier 46 to cathode ray tube 48. Thus, the average DV voltage on cathode 24 of tube 21 will be dependent on the DC voltage at the output of detector 16 which is in turn dependent upon two factors, namely the amplitude and picture content of the received television signal.

Figure 3:
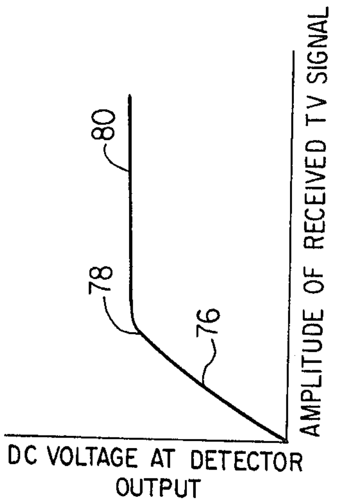
FIG. 3 is a graph of the amplitude of the received television signals plotted against the average DC voltage at the detector output.

FIG. 3 illustrates the average DC voltage at the output of detector 16 plotted against the amplitude of the received television signal. As represented by portion 76, the average DC voltage will increase as the amplitude of the received television signal increases. When point 78 is reached, further increase in the level of the television signal will result in little, if any, increase in amplitude of the DC voltage as shown by portion 80. This characteristic is, of course, due to the AGC circuit 30 maintaining the detector output relatively constant to the right of point 78. But due to inherent limitations of an AGC circuit, the detector output is not independent of changes in the level of received television signals to the left of point 78. Since electron tube 58 is connected to cathode 24, the same phenomenon can be observed on cathode 52. Circuitry is provided to maintain noise cancelling circuit 32 independent of the characteristic shown on FIG. 3 for reasons which will hereinafter be explained.

Figure 4:
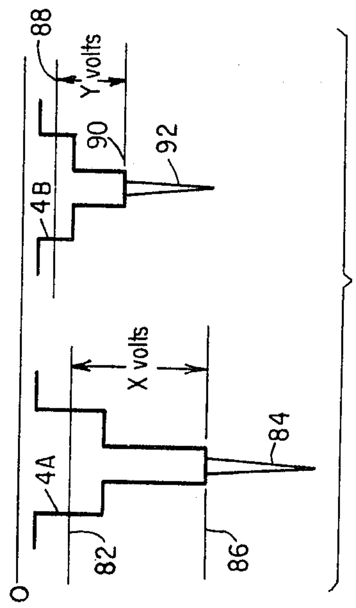
FIG. 4 illustrates waveforms at the input to the noise canceling circuit without utilizing the present invention.

Assuming the received television signal to be of sufficient strength to operate the AGC and assuming further that a gray picture is being transmitted, then the average DC voltage on cathode 52 of tube 58 will be amplitude 82 shown on waveform 4A of FIG. 4. It is desired that only noise pulses greater in amplitude than the synchronizing pulses be amplified by tube 58; that is, only a noise pulse 84 more negative than amplitude 86 should cause tube 58 to be conductive. To this end, a constant voltage supply 67 is employed in conjunction with potentiometer 66 and grid current resistor 64 for establishing a constant bias on grid 54. The movable arm on potentiometer 66 is set so that a pulse having a peak amplitude of X volts (FIG. 4) greater than the average amplitude 82 will cause tube 58 to conduct.

If the amplitude of the received television signal decreases so that the AGC is inoperative, waveform 4B will be present on cathode 52. As shown, the average DC voltage component 88 has become less negative, as has the maximum peak amplitude 90, with the result that only Y volts is available whereas the voltage required to cause tube 58 to conduct is X volts. If a noise pulse 92 is present on waveform 4B, only a portion of the disturbance will be of sufficient amplitude to cause tube 58 to conduct and thus incomplete noise cancellation will result.

In order to remove the effect that the average DC component due to changes in signal strength has on tube 58, resistor 60 is employed, the value of which is much smaller than the value of resistor 64. Thus, any change in the average DC voltage on cathode 52 will also be present on grid 54. The result may be shown in greater detail by reference to FIG. 5 where waveform 5A represents a video signal on cathode 52 due to a received television signal of sufficient strength to fall within the relatively flat portion 80 of FIG. 3. Voltage 94 appearing on cathode 52 and voltage 96 appearing on grid 54 result from the combination of the bias potential impressed on tube 58 and the average DC component of the video signal superimposed on each of these voltages. When the level of the received television signal decreases in amplitude, a waveform 5B, corresponding to a signal within portion 76 of FIG. 3 where the AGC is not operative, will be present on cathode 52. The potential on cathode 52 will increase to voltage 91 due to the change in the average DC component and since the grid will follow the cathode, the potential and grid 54 will move less negative by a like amount to voltage 93.

Waveforms 5C and 5D result from received television signals of sufficient strength to render the AGC operative. For a black picture as shown by waveform 5C, the potential on cathode 52 will become more negative than voltage 94 in waveform 5A, and will move to voltage 95. Cathode to grid tracking causes the grid potential to decrease to voltage 97. Similarly for a white picture shown by waveform 5D, the cathode and grid potentials will rise from the corresponding voltages in waveform 5A to voltages 99 and 101 respectively.

In FIG. 1, capacitor 63 serves to bypass AC signals on grid 54 so that, although the grid will follow cathode 52 for changes in the average DC voltage, it will not for AC signals and the video signal present on cathode 52 will not be shunted around tube 58 but rather will be amplified by it.

It will be noted that with the bias initially set so that grid 54 has a voltage 96 applied to it, only noise pulses more negative than said voltage will be amplified by tube 58 and hence noise pulses on waveforms 5B or 5C will not be fully amplified while tube 58 will not only amplify any noise pulses on waveform 5D but will also cause cutoff of part of the synchronizing pulse. Hence, the bias on tube 58 must follow changes in the amplitude of the received television signal and changes on its associated picture content so that noise pulses greater in amplitude than the synchronizing pulse, regardless of the energy content of the video signal are amplified by tube 58. A control voltage on grid 37 of synchronizing separator circuit 34 is used for this purpose as will now be explained.

The positive polarity video signal on anode 22 of video amplifier tube 21 is conducted through matrixing and isolation network 28 to a double time constant circuit comprising capacitor 70, resistor 72, capacitor 74, and resistor 62, the combination of which operates to block the average DC component and to establish a bias on grid 37 of synchronizing separator circuit 34 so that only synchronizing pulses are amplified by electron tube 35 independent of the amplitude of the synchronizing pulse or the picture content in the composite signal. To accomplish this, the inherent operation of a grid-leak detector is utilized where, as those skilled in the art will recognize, the DC potential on grid 37 becomes more negative as the amplitude of the received television signal increases and/or as the picture content becomes more black. This DC control potential is conducted to grid 54 of tube 58 via resistor 62, the value of which is relatively small in comparison with the value of resistor 64 so that a large portion of the DC potential originating at grid 37 will appear on grid 54. Since resistance 60 is much larger than resistance 26 a negligible portion of the DC potential originating at grid 37 will appear on cathode 52.

Figure 5:
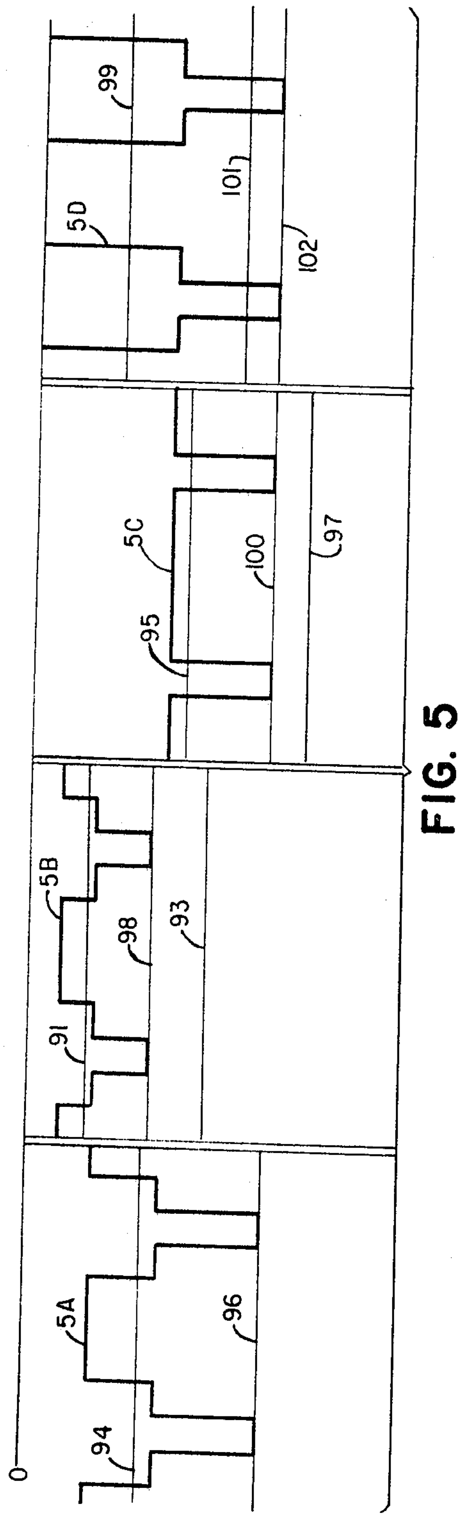
FIG. 5 illustrates waveforms at the input to the noise canceling circuit utilizing the present invention.

Reference is made to FIG. 5 to illustrate the effect that this control potential has on noise cancelling circuit 32. As was previously explained, the voltage on grid 54 is initially set via potentiometer 64 so that a noise pulse on waveform 5A will cause tube 58 to conduct. When the signal amplitude decreases as shown by waveform 5B, the peak amplitude has decreased to potential 98. Since the control potential on grid 37 of synchronizing separator circuit 34 becomes less negative as the amplitude of the received television signal decrease, the voltage on grid 54 is raised from that shown as level 93, where it otherwise would be, to potential 98 on waveform 5B. Thus, even though the signal level decreases, tube 58 will conduct to amplify noise pulses greater in amplitude than the peak amplitude of the synchronizing pulse.

Waveforms 5C and 5D represent video signals where the AGC is operative, the former being a black picture and the latter a white picture. For a black picture as illustrated in waveform 5C, the potential on grid 54 is at voltage 97. Since the control potential on grid 37 of synchronizing separator tube 35 will become less negative as the picture becomes blacker, the voltage on grid 54 will rise to potential 100. The reverse occurs for a white picture where, as shown by waveform 5D for a white picture, the control potential on grid 37 will become more negative thereby causing a corresponding decrease on grid 54 from voltage 101 to voltage 102. Thus, although the picture content changes, tube 62 will be conductive to amplify only those noise pulses greater in amplitude than the synchronizing pulse. The two factors determining the conduction level of tube 62, namely the amplitude and picture content of the received television signal, have been analyzed independently for convenience in illustration but obviously in practice they are likely to occur simultaneously.

It is now readily apparent why it is desirable that the bias on tube 58 be maintained independent of the average DC component. With reference to FIG. 5, if there were no circuitry provided to cause grid 54 to track cathode 52, the following would occur: For a black picture, as shown by waveform 5C, the control potential from synchronizing separator circuit 34 would cause the grid to rise above voltage 100, and for a white picture as shown by waveform 5D the control potential would cause the grid to fall below voltage 102, voltages 100 and 102 being equivalent to voltage 96 on waveform 5A, the initial grid bias setting. The result would be to provide incomplete noise cancellation for a white picture and loss of the synchronizing pulse for a black picture.

Figure 2:
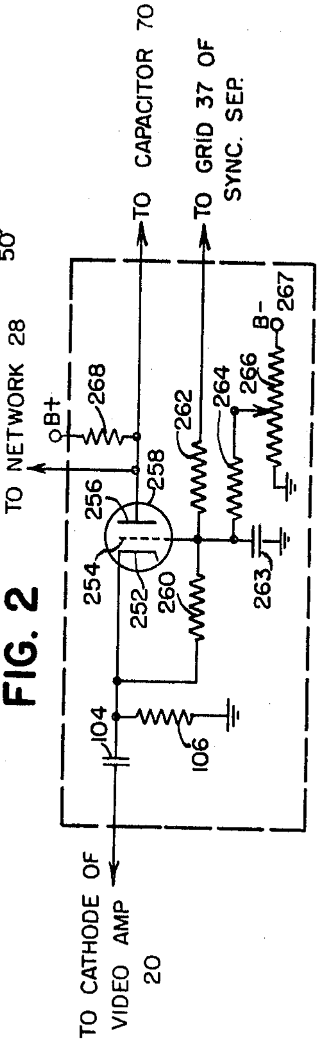
FIG. 2 is a schematic diagram of a second embodiment of the invention.

FIG. 2 shows a second embodiment where components corresponding to those in FIG. 1 are indicated by similar reference numerals but with a factor of 200 added on. For the same reasons as those explained with respect to FIG. 1, it is necessary to remove the effect that the average DC component due to changes in signal strength has on tube 58. This is accomplished by placing capacitor 104 in the signal path between cathode 24 of video amplifier 20 and cathode 252 of noise cancelling tube 258 to block the DC component. Resistor 106 provides a DC return for cathode 252 and is sufficiently large so as not to cause any significant change in the cathode impedance of video amplifier 20. Capacitor 263 on grid 254 bypasses AC. A constant voltage supply 267, in conjunction with potentiometer 266 and grid current resistor 264 establishes a bias on grid 254. The movable arm of potentiometer 266 is set so that a noise pulse will cause tube 258 to conduct when a television signal with gray picture content and of sufficient amplitude to operate the AGC is received. Resistor 262 couples the control potential from grid 36 of the synchronizing separator circuit 34 to grid 254 to cause the bias on tube 258 to vary with changes in the amplitude of the received television signal and changes in the picture content. Thus, tube 258 will amplify noise pulses greater in amplitude than the synchronizing pulse independent of the energy content of the video signal. The noise pulse appearing on anode 256 will combine with waveform 27 in matrixing and isolation network 28 to provide a signal which is substantially free of noise pulses greater in amplitude than the synchronizing pulse.

What has been described, therefore, is an improved noise cancelling circuit for a television receiver which automatically adjusts the bias supplied thereto according to strength of the received television signal and associated picture content. This is simply and inexpensively accomplished in a circuit which effectively functions in a receiver of otherwise known construction.

I claim:

1. In a television receiver having a source of positive and negative polarity video signals, including corresponding synchronizing signal components, said video signals subject to being accompanied by unwanted noise components, a noise canceling circuit including the combination of, an electron discharge device having a cathode, a grid and an anode, means coupling said source of negative polarity video signals to said cathode, resistance means coupling a direct current voltage source to said grid to establish a bias for said electron discharge device, the value of said bias being such that only negative polarity noise components greater in amplitude than said synchronizing signal components are amplified to appear on said anode, means coupling said anode to said source of positive polarity video signals for canceling said noise components, synchronizing signal separator means, self-biasing means coupling said source of positive polarity video signals to said synchronizing signal separator means, said self-biasing means responsive to said positive polarity video signals for establishing a control potential on said synchronizing signal separator means which varies with the amplitude of said synchronizing signal components, resistance means coupling said synchronizing signal separator means to said grid for changing said bias in accordance with the amplitude of said synchronizing signal components thereby providing complete cancellation of said noise components greater in amplitude than said synchronizing signal components for varying amplitudes of said synchronizing signal components.

2. In a television receiver having a detector direct current coupled to a video amplifier with a cathode resistor across which appears video signals with synchronizing pulses which may be accompanied by undesirable noise pulses exceeding the amplitudes of the synchronizing pulses, a noise cancelling circuit, including in combination, a first amplifier device having cathode, grid and anode electrodes, means coupling said cathode electrode to the cathode resistor, capacitor means bypassing said grid electrode, a first resistor large with respect to the cathode resistor coupled between said cathode and grid electrodes, an adjustable biasing circuit connected to said grid electrode and including further resistor means having a value large with respect to said first resistor means, whereby only the alternating current component of said video signals is applied between said cathode and grid electrodes, means connected to said anode electrode for cancelling noise pulses in said video signals by amplitude separated noise pulses from said first amplifier device, a synchronizing signal separator circuit including a second amplifier device with a grid element, a self-biasing circuit responsive only to the alternating current component of the video signal connected to said grid element of said second amplifier device, and a direct current circuit between said grid electrode of said first amplifier device and said grid element of said second amplifier device to vary the bias of said first amplifier device with a change in alternating current component of the video signal so that amplitude separation of noise pulses tracks the video signal level.

3. In a television receiver having a detector direct current coupled to a video amplifier with a first resistor across which appears video signals with synchronizing pulses which may be accompanied by undesirable noise pulses exceeding the amplitudes of the synchronizing pulses, a noise cancelling circuit, including in combination, a first amplifier device having first and second electrodes and an output electrode, means coupling said first electrode to the first resistor, capacitor means bypassing said second electrode, a second resistor large with respect to the first resistor coupled between said first and second electrodes, an adjustable biasing circuit connected to said second electrode and including third resistor means having a value large with respect to said second resistor means, whereby only the alternating current component of said video signals is applied between said first and second electrodes, means coupled to said output electrode for cancelling noise pulses in said video signals by amplitude separated noise pulses from said first amplifier device, a synchronizing signal separator circuit including a second amplifier device with an input electrode, a self-biasing circuit responsive only to the alternating current component of the video signal connected to said input electrode of said second amplifier device, and a direct current circuit between said second electrode of said first amplifier device and said input electrode of said second amplifier device to vary the bias of said first amplifier device with a change in alternating current component of the video signal so that amplitude separation of noise pulses tracks the video signal level.

References Cited

UNITED STATES PATENTS

| | | | |
|---|---|---|---|
| 3,090,832 | 5/1963 | Floyd | 178—7.3 |
| 3,182,122 | 5/1965 | Kao | 178—7.3 |
| 3,182,123 | 5/1965 | Kao | 178—7.3 |

ROBERT L. GRIFFIN, *Primary Examiner.*

ALFRED H. EDDLEMAN, *Assistant Examiner.*

U.S. Cl. X.R.

178—7.3